(12) United States Patent
García I Erill

(10) Patent No.: US 8,480,362 B2
(45) Date of Patent: Jul. 9, 2013

(54) METHOD FOR DYNAMICALLY LUBRICATING A WIND TURBINE PITCH BLADE BEARING

(75) Inventor: Daniel García I Erill, Barcelona (ES)

(73) Assignee: Alstom Wind S.L., Barcelona (ES)

( * ) Notice: Subject to any disclaimer, the term of this patent is extended or adjusted under 35 U.S.C. 154(b) by 1030 days.

(21) Appl. No.: 12/516,748

(22) PCT Filed: Nov. 26, 2007

(86) PCT No.: PCT/EP2007/062833
§ 371 (c)(1),
(2), (4) Date: May 28, 2009

(87) PCT Pub. No.: WO2008/065088
PCT Pub. Date: Jun. 5, 2008

(65) Prior Publication Data
US 2010/0068055 A1 Mar. 18, 2010

(30) Foreign Application Priority Data
Nov. 28, 2006 (EP) .................................... 06124959

(51) Int. Cl.
*F03D 11/00* (2006.01)
*F03D 7/00* (2006.01)
*F16N 11/00* (2006.01)

(52) U.S. Cl.
USPC ............... 416/1; 416/37; 416/41; 416/146 A; 416/174

(58) Field of Classification Search
USPC ............... 416/36–38, 41, 47, 48, 174, 146 A, 416/147
See application file for complete search history.

(56) References Cited

U.S. PATENT DOCUMENTS 6,774,504 B1 * 8/2004 Lagerwey .................. 290/44
6,877,360 B1   4/2005 Discenzo
(Continued)

FOREIGN PATENT DOCUMENTS

DE        20021026 U1   3/2001
DE    202005014699 U1  12/2005
(Continued)

OTHER PUBLICATIONS

Notification of Transmittal of the International Search Report and the Written Opinion of the International Searching Authority, or the Declaration, Nov. 14, 2008, European Patent Office.

(Continued)

*Primary Examiner* — Edward Look
*Assistant Examiner* — Jesse Prager
(74) *Attorney, Agent, or Firm* — Squire Sanders (US) LLP

(57) ABSTRACT

The method consists in determining at least one of wind turbine operating conditions or parameters related to pitch activity 116-119; determining if lubrication is needed depending on at least the operating conditions or the pitch activity parameters 116-119; and causing lubrication of the pitch blade bearing if lubrication is determined to be needed. Lubrication may consist in injecting grease during a period of time and causing the blades of the wind turbine to be rotated if necessary during grease injection. The device includes means for determining wind turbine operating conditions, means for determining parameters related to pitch activity, a wind turbine main control 100 for determining if lubrication is needed depending on operating conditions and pitch activity parameters 116-119, and means for causing lubrication of the pitch blade bearing if lubrication is needed.

6 Claims, 1 Drawing Sheet

U.S. PATENT DOCUMENTS

| | | |
|---|---|---|
| 2004/0240997 A1 | 12/2004 | Wobben |
| 2006/0204360 A1 | 9/2006 | Hinz et al. |
| 2007/0081896 A1* | 4/2007 | Mollhagen .................... 416/98 |
| 2007/0216164 A1* | 9/2007 | Rivas et al. .................... 290/44 |

FOREIGN PATENT DOCUMENTS

| | | |
|---|---|---|
| EP | 1273814 A1 | 1/2003 |
| EP | 1286048 A1 | 2/2003 |
| ES | 2199677 B1 | 3/2005 |
| JP | 63109944 A | 5/1988 |
| JP | 05-256395 | 10/1993 |
| WO | WO0121956 A1 | 3/2001 |
| WO | WO03019004 A1 | 3/2003 |

OTHER PUBLICATIONS

Japanese Examination Report dated Jun. 5, 2012 for JP 2009-538693, 3 pgs.

* cited by examiner

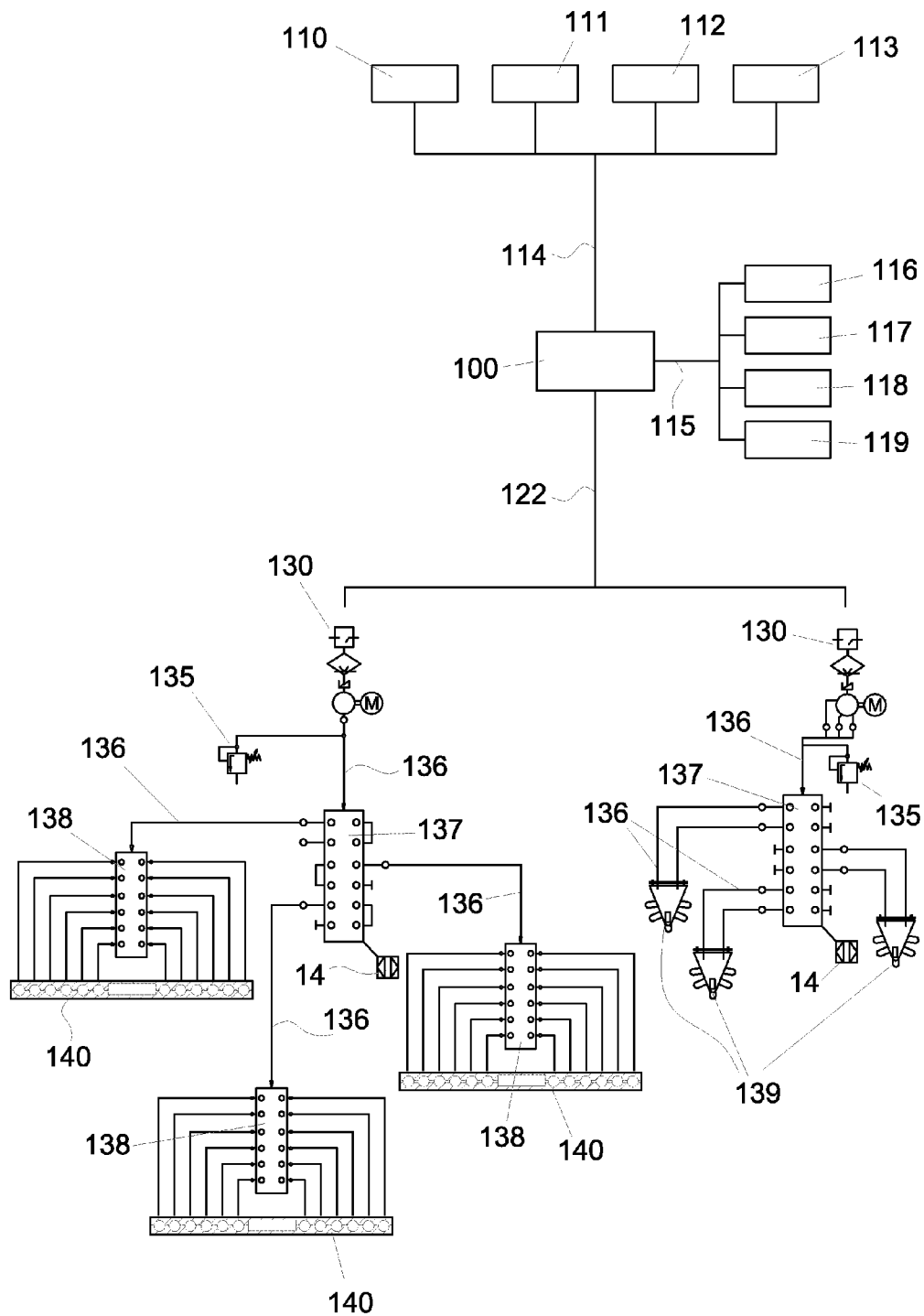

METHOD FOR DYNAMICALLY LUBRICATING A WIND TURBINE PITCH BLADE BEARING

FIELD OF THE INVENTION

The present invention relates to a method for dynamically lubricating a wind turbine blade pitch bearing. The invention further refers to a device for carrying out such a dynamic lubrication of a blade pitch mechanism.

BACKGROUND ART

Pitch blade mechanism acts on the blades of a wind turbine rotor for changing their respective angles of attack for achieving the maximum power. For this reason, blades are pivotally guided about an axis by bearings. In order to extend service life of the pitch blade mechanism, its race track and toothing have to be lubricated.

Blade pitch rotation is a function of the wind speed (low winds requires blades arranged at a minimum pitch angle and high winds requires pitch angle to be varied by rotating blades in order to change pitch angle blade angle of attack-). For both cases it is very important to perform a good lubrication on pitch bearing (race track and toothing).

Wind turbines work in different operating conditions, and therefore blade pitch activity is different for each wind turbine. Consequently, grease required for each wind turbine mechanism is also different and usually this is not optimized.

Prior art lubricating methods consist in automatically injecting grease by means of a pump system to the bearing. Known injection methods provide grease every so often regardless of the wind turbine activity and other conditions. Known lubricating methods are either manual or automatic.

A prior art manual method for lubricating a wind turbine mechanism involves completely manual operations that are programmed periodically by a maintenance service. Said operations comprise stopping the wind turbine, manually injecting grease to such mechanism by maintenance personal, and starting-up the wind turbine until the following programmed maintenance date.

WO03019004 discloses how a rotor blade of a windmill is lubricated. A lubricating grease cartridge is used that is connected by way of a feed duct to rolling bodies. Lubricant is then urged under pressure out of the lubricating grease cartridge to said rolling bearing and lubricates it. The lubricating grease which is urged out of the rolling bearing can only escape to the underside of the rolling bearing into a lubricant chamber, that grease being still used to lubricate the pitch drive.

Automatic methods for lubricating a wind turbine mechanism are carried out by using a centralized lubrication device that are installed inside the wind turbine. The device includes a pump system fitted with PLC that pumps grease from a cartridge through a circuit that distributes grease to the necessary points of the mechanism to be lubricated. The device performs a totally automatic lubricating method according a cyclic program.

U.S. Pat. No. 6,877,360 discloses a system and a method for dynamic lubrication adjustment for a lubrication analysis system. A control module is provided having a processor and sensors providing data that will be used by the processor to monitor the fluid. The processor dispenses the fluid based upon one or more parameters of the fluid.

JP63109944 refers to a method of supplying suitable amount of oil air to bearing rotating member for controlling an amount of oil supplied to a bearing of a rotating member. A programmable control unit acting on valves is provided and depends on the rotating condition of the rotating member. Oil is supplied into pipes and a timer in the programmable control unit is stopped by being operated for a suitable period of time so that the valves are closed. Therefore, lubrication is made based on a prescribed lubrication time and lubrication interval.

Providing a periodic cyclic lubrication in systems that do not have a cyclic behaviour has not proven to be advantageous. In case of a wind turbine blade pitch mechanism this is more significant since wind turbines have two differing operating thresholds, that is, with the wind turbine in power production having the blades always fixed at the same pitch angle (wind at about 0-10 m/s) or having the blades at a varying pitch angle (wind at about 11-25 m/s). These two operating thresholds require different lubricating criteria. Wind speed is a phenomenon having a non excessively cyclic behaviour (it can be said that it is at the most statistical).

It has been found that cyclic lubrication, especially in wind turbine systems, suffers from many disadvantages such as, for example, undesirable grease consumption, a limited pitch bearing life time, false brinelling effect, high costs, long time of maintenance and environmental pollutants.

SUMMARY OF THE INVENTION

An object of the invention is to provide a method by means of which lubrication of the bearing arrangement in a pitch blade mechanism is improved. More particularly, a method for dynamically lubricating a wind turbine blade pitch bearing according to the invention comprises the steps of:
  determining at least one of wind turbine operating conditions or parameters related to pitch activity
  determining if lubrication is needed depending on at least the operating conditions or the pitch activity parameters; and
  causing lubrication of the pitch blade bearing if lubrication is determined to be needed.

A further step may be performed consisting in selecting a lubrication mode if lubrication is determined to be needed. Said lubrication mode may comprise injecting grease during a period of time according to at least wind turbine operating conditions or pitch activity. In some embodiments, the lubrication mode may further comprise causing the blades of the wind turbine to be rotated during grease injection so that grease may enter bearing. In other words, the pitch angle is varied when necessary for improving bearing lubrication.

The operating conditions may include at least one or more of the parameters selected from wind turbine working site and wind speed. On the other hand, parameters related to pitch activity may include at least one or more of the parameters selected from blade turns by the wind turbine pitch blade mechanism and the period of time the wind turbine is operating. Said parameters related to pitch activity may be determined by one or several counters.

The present invention further relates to a device for dynamically lubricating a wind turbine pitch blade bearing. A device according to the invention comprises one or several electrical pumps that pumps grease from a reservoir and at least one distributor linked to the pump that delivers grease to points of the pitch blade bearing to be lubricated.

The device may be also provided with means for determining wind turbine operating conditions, means for determining parameters related to pitch activity, a wind turbine main control for determining if lubrication is needed depending on operating conditions and pitch activity parameters, and means for causing lubrication of the pitch blade bearing if lubrication is needed.

Lubrication of the blade pitch mechanism bearing is therefore performed dynamically and centrally through the wind turbine main control. The main control include a computer control unit that monitors at every time the wind turbine status by receiving information about, for example, wind turbine operating conditions (working site, wind speed), and/or parameters related to pitch activity (blade turns, period of time the wind turbine is operating, etc). The main control therefore acts intelligently sending a suitable output command from said information to perform a particular lubrication mode.

The device may further include means for sensing that at least a minimum volume of the grease is present in said reservoir and means for detecting grease blocking downstream the pump.

The method and the device herein described according to the invention provide many advantages over prior art methods and device used for the same purpose. Said advantages include, for example, an optimized grease consumption (grease is provided only as required and quantity of grease injected is optimized), an increased pitch bearing life time, reducing the false brinelling effect (when bearing is not rotating, problems could arise when there is a direct contact with bearing balls and race track and no grease is present), as well as reducing time and cost of maintenance and environmental pollutants.

According to the invention, lubrication is not commanded by a cyclical program as in prior art methods but it is dynamically controlled and optimized for each wind turbine by its own main control. As stated above, the dynamic lubrication according to the invention is an active method (instead of prior art passive lubrication methods) which further permits performing blade pitch movements in order to improve pitch bearing lubrication if necessary.

BRIEF DESCRIPTION OF THE DRAWINGS

A particular embodiment of a method for dynamically lubricating a wind turbine pitch blade bearing according to the present invention will be described in the following, only by way of non-limiting example, with reference to the appended drawing, in which a block diagram is diagrammatically shown. The drawing also depicts parts of a device according to the invention.

DESCRIPTION OF PARTICULAR EMBODIMENTS

In the embodiment which will be described, the method of the invention is carried out by a device for dynamically lubricating a wind turbine pitch blade bearing.

The device of the invention comprises a wind turbine main control 100 connected to a series of counters 110-113 and electrical pumps 130.

The main control 100 receives input data 114 from said counters 110-113 that numerically quantify the wind generator activity by counting parameters relating to pitch activity. The main control 100 also receives input data 115 about wind turbine operating conditions 116-119.

The main control 100 receives said input data 114, 115 and then determines if the wind turbine pitch blade bearing requires lubrication. Of course a different number of counters and conditions may be provided and programmed.

In one example, a counter 110 is provided for counting the number of blade turns caused by pitch movement. Another counter 111 is provided for counting the number of hours the wind turbine is in power production. A further counter 112 is provided for counting the number of hours the wind turbine is in power production with the blades always stationary at the same pitch angle.

If lubrication is determined to be needed, an output command 122 is sent by the main control 100 for operating the pumps 130 connected thereto. Pumps 130 are then operated for delivering grease from reservoirs (not shown) through overpressure valves 135 and ducts 136 to main and secondary distributors 137, 138. Distributors 137, 138 deliver grease to pitch bearing points of greasing 139, 140 in the blade pitch mechanism.

If lubrication is determined not to be needed, no pumps 130 are operated.

A lubrication mode can be selected if lubrication is determined to be needed by the main control 100. The lubrication mode can consist in injecting grease to pitch bearing during a determined period of time according to input data 114, about pitch activity, from counters 110-113 and/or input data 115 from wind turbine operating conditions and causing the blades of the wind turbine to be rotated during grease injection if necessary so that grease can enter the blade pitch bearing.

A timer is provided (not shown) for determining the length of time each grease injection process lasts on lubrication. Each period of time is defined in the different programmed lubrication strategy and it is calculated for injecting a determined quantity of grease that is necessary according to a specific lubrication strategy in view of different conditions (wind turbine operating conditions and/or parameters related to pitch activity).

Input data 114 from counters 110-113 is closely associated with input data 115 from wind turbine operating conditions. In this sense, according to the geographical area different wind speeds (higher, lower, more constant, more varying), temperatures and other weather conditions may occur (rain, air density, a more or less defined wind profile) which alters the wind turbine operation. For example, depending on the wind speed, the blade pitch angle has to be varied (with a <10 m/s wind speed, blade pitch angle is always fixed and with a>11 m/s wind speed, blade pitch angle is constantly varied). These conditions are quantified by counters 110-113. In this sense, having the blades fixed at the same pitch angle during a long time can be dangerous since grease may disappear from the point of contact thus resulting in wear (false brinelling effect). By causing the blades of the wind turbine to be rotated during grease injection, according to the above mentioned lubrication mode of the method of the invention, grease enters wherever is necessary.

The wind turbine main control 100 has a software programming for dynamically controlling lubrication. A main program that manages and controls wind turbine operation is provided including a sub-program that permits lubrication to be dynamically controlled. That sub-program is parameterized such that parameters set for each site and type of wind turbine can be edited and modified. The sub-program defines a lubrication strategy to be used, combining different wind turbine operating parameters.

One example of a lubrication strategy could be considering several conditions 116-119, such as for example:

a first condition 116 in which for 1000 accumulated revolutions due to blade movement a lubrication is performed consisting in operating grease pumps 130 for lubricating both the inner crown toothing and the bearing race track over 30 seconds (time calculated so that the required volume of grease is fed);

a second condition 117 in which for 150 accumulated hours with the wind turbine is in power production a lubrication is performed as in first condition 116;

a third condition 118 in which if the number of accumulated hours the wind turbine is in power production with the blade always stationary in the same pitch angle, equal to 10 hours and the mean wind speed <7 m/s, a lubrication is performed consisting in operating grease pumps 130 for lubricating both the inner crown toothing and the bearing race track over 30 seconds (time calculated so that the required volume of grease is fed);

a fourth condition 119 in which if the number of accumulated hours the wind turbine is in power production with the pitch blade always stationary in the same angle, equal to 10 hours and the mean wind speed >=7 m/s, a lubrication is performed consisting in operating grease pumps for lubricating both the inner crown toothing and the bearing race track over 15 seconds (time calculated so that the required volume of grease is fed) when the wind turbine is moving the blades for adjusting speed.

Software can be also modified by adding new conditions and new types of lubrication with the purpose of defining new lubrication strategies and counters.

Once completed any of the defined lubrication strategies according to conditions 116-119, all the counters 110-113 are set to zero so that when any of the programmed conditions 116-119 occur then another lubrication is performed, and so forth.

The device for dynamically lubricating a wind turbine pitch blade bearing herein described according to the invention may further include means for detecting grease blocking. This means are provided downstream the pumps 130 and comprise an operating control system including a cycle detector 141 that is connected to a each main distributor 137. As grease runs through ducts and the main distributors 137, pistons (not shown) are cyclically moved end to end so that during a lubrication period (for example, 30 second) each cycle detector 141 have counted a determined number of piston displacements which means that the device is working properly. When a determined number of piston displacements is not performed, this is detected by the cycle detector 14 as the device is not working properly in which case a locked circuit warning signal is sent to a maintenance point for planning a circuit repairing task and disabling all types of lubrication of the affected circuit.

The device of the invention is further provided with means for sensing that at least a minimum volume of the grease is present in the corresponding reservoir. More particularly, grease reservoirs of each electric pump 130 are provided with a sensor (not shown) for indicating that the pump 130 is almost empty, that is, a small amount of grease is present inside the reservoir, in which case a warning signal about the reservoir is almost empty is sent to a maintenance point for planning a task for reloading the grease reservoir. Several or all of the lubrication operations may be disabled to extend grease reserve in the reservoir.

The invention claimed is:

1. A method for dynamically lubricating a wind turbine pitch blade bearing comprising the operations of:
    a) determining wind turbine operating conditions including at least one or more parameters selected from a wind turbine working site and wind speed;
    b) determining if lubrication is needed depending on the operating conditions;
    c) causing lubrication of the pitch blade bearing if the determination in operation b) is positive; and
    d) if the determination in step b) is positive, selecting a lubrication mode comprising causing the blades of the wind turbine to be rotated during grease injection.

2. The method according to claim 1, wherein the determining step further depends on pitch activity parameters, wherein the parameters related to pitch activity include at least one or more parameters selected from blade turns by a wind turbine pitch blade mechanism and a period of time a wind turbine is operating.

3. The method according to claim 2, wherein the determining step further depends on pitch activity parameters, wherein the parameters related to pitch activity are determined by at least a counter.

4. A device for dynamically lubricating a wind turbine pitch blade bearing comprising means for determining wind turbine operating conditions, means for determining parameters related to pitch activity, a wind turbine main control for determining when lubrication is needed depending on the operating conditions selected from a wind turbine site and wind speed, means for causing lubrication of the pitch blade bearing when lubrication is needed and at least one pump that pumps grease from a reservoir, and at least one distributor linked to said pump that delivers grease to points of the pitch blade bearing to be lubricated.

5. The device according to claim 4, further comprising means for sensing that at least a minimum volume of the grease is present in said reservoir.

6. The device according to claim 4, further comprising means for detecting grease blocking downstream of the pump.

\* \* \* \* \*